United States Patent [19]
Barber et al.

[11] Patent Number: 5,442,806
[45] Date of Patent: Aug. 15, 1995

[54] PREFERRED CARRIER SELECTION METHOD FOR SELECTING ANY AVAILABLE CELLULAR CARRIER FREQUENCY WHEN NEITHER HOME NOR PREFERRED CELLULAR CARRIER FREQUENCIES ARE AVAILABLE

[75] Inventors: Clifton J. Barber, Forest Park; Stephen T. Hardin, Snellville, both of Ga.

[73] Assignee: Oki Telecom, Suwanee, Ga.

[21] Appl. No.: 73,947

[22] Filed: Jun. 8, 1993

[51] Int. Cl.[6] .............................................. H04Q 7/00
[52] U.S. Cl. .................................. 455/33.1; 455/54.1; 379/59
[58] Field of Search ................ 455/33.1, 33.2, 33.4, 455/34.1, 54.1, 56.1, 161.1, 166.2, 34.2; 379/59, 60

[56] References Cited

U.S. PATENT DOCUMENTS

| | | | |
|---|---|---|---|
| 4,734,928 | 3/1988 | Weiner et al. | 379/59 |
| 4,736,453 | 4/1988 | Schloemer | 455/33 |
| 4,775,999 | 10/1988 | Williams | 379/59 |
| 4,833,701 | 5/1989 | Comroe et al. | 379/60 |
| 4,833,702 | 5/1989 | Shitara et al. | 379/60 |
| 4,903,320 | 2/1990 | Hanawa | 455/34.2 |
| 4,916,728 | 4/1990 | Blair | 379/59 |
| 4,965,850 | 10/1990 | Schloemer | 455/33 |
| 4,972,355 | 11/1990 | Mullins | 379/59 |
| 5,020,091 | 5/1991 | Krolopp et al. | 379/58 |
| 5,020,093 | 5/1991 | Pireh | 379/59 |
| 5,097,499 | 3/1992 | Cosentino | 379/59 |

OTHER PUBLICATIONS

"Cellular Mobile Telephone by Motorola" Model 820 1989. America Series.
"Your Portable Connection" America Series 865.
Nokia LXTIC Car-To-Car/Transferable—With Battery Option.

*Primary Examiner*—Reinhard J. Eisenzopf
*Assistant Examiner*—Thanh Le
*Attorney, Agent, or Firm*—Louis T. Isaf; Jeffrey R. Kuester

[57] ABSTRACT

A method and an apparatus for selecting a cellular carrier frequency for accessing cellular airtime services based upon a list of preferred system identification codes (SIDs). A cellular telephone is programmed to accept into memory a list of preferred SIDs corresponding to carriers through which service is preferred. While any SID remains in a preferred list, the standard A/B system selection function is replaced by a substitute system selection function which includes only three carrier selection modes including the Home Only mode, the SID Only mode, and a Roam Saver mode. With the Roam Saver carrier selection mode, the cellular telephone first prefers service through a home carrier and then through a carrier broadcasting a SID matching a SID on the preferred list, but never denies service to emergency or non-emergency destinations if any SID is detected. Status indicators are used to, among other purposes, differentiate between no service being available, service being available through a carrier broadcasting a home SID, a preferred SID, or a non-preferred available SID. Also, in addition to multiple number assignment modules (NAMs) being included to support subscriptions to services from multiple carriers, the user is provided the option of manually selecting which NAM is used or enabling the cellular telephone, through an auto-NAM function, to automatically select and use the NAM of any home carrier detected by the cellular telephone.

38 Claims, 4 Drawing Sheets

| PRIORITY LEVEL | SID DETECTED | NO SERVICE INDICATOR | ROAM INDICATOR |
|---|---|---|---|
| 1 | PRIMARY HOME | OFF | OFF |
| 2 | SECONDARY HOME | OFF | OFF |
| 3 | PRIMARY PREFERRED | OFF | CONTINUOUS |
| 4 | SECONDARY PREFERRED | OFF | CONTINUOUS |
| 5 | PRIMARY AVAILABLE | OFF | BLINKING |
| 6 | SECONDARY AVAILABLE | OFF | BLINKING |
| 7 | NO SERVICE | ON | OFF |

PREFERRED CARRIER SELECTION METHOD FOR SELECTING ANY AVAILABLE CELLULAR CARRIER FREQUENCY WHEN NEITHER HOME NOR PREFERRED CELLULAR CARRIER FREQUENCIES ARE AVAILABLE

BACKGROUND OF THE INVENTION

The present invention relates generally to the field of telecommunications, and more specifically, to the field of cellular carrier selection.

A cellular telephone communication system typically provides services to an area by dividing the area into many smaller geographic areas, known as cells, each of which is serviced by a transmitter-receiver station, known as a cell site. The cell sites are connected through landlines, or other communication links, to so-called mobile telephone switching offices (MTSO's) which are, in turn, connected to the public switched telephone network (PSTN). According to current FCC rules, any given area is serviced by up to two competing providers of cellular airtime communication services (i.e., cellular carriers). The two service providers in any given geographic area, commonly referred to as "A" and "B" carriers, are assigned different groups of frequencies, or frequency sets, through which services are provided along paging, control, access, and voice channels, as would be understood by those reasonably skilled in the industry and as dictated by technical standards of appropriate regulatory agencies.

According to typical contemporary billing rate structures, distinctions are made relative to whether or not the user has subscribed to airtime services with the carrier currently being accessed. If a call is originated within an area serviced by a carrier with which the caller has a pre-existing billing arrangement such that a local telephone number has been assigned to the cellular telephone by that carrier, the call can potentially be less expensive than a call made outside such a so-called "home" area, during which time the cellular telephone is said to be "roaming" with respect to that carrier. A typical cellular telephone contains memory locations known as a number assignment module (NAM) in which an installer technician stores an assigned telephone number and a system identification code (SID) which uniquely identifies a particular carrier which is primarily intended to provide airtime service for that telephone. This carrier is referred to as the "home" carrier. Since each carrier broadcasts its unique SID in areas serviced by that carrier, a cellular telephone, in order to determine whether it is, at any given time, located within its home service area, typically scans certain frequencies to receive SIDs broadcast by the carriers and then compares the received SIDs to SIDs stored in the NAM.

"A" frequencies are reserved for nonwireline carriers, while "B" frequencies are reserved for wireline carriers. Due at least in part to anticipated cooperation between similar types of carriers, conventional cellular telephones enable users to choose among six carrier selection methods, commonly referred to as the standard A/B system selection feature. The six options include Prefer A, Prefer B, A Only, B Only, Home Only, and SID Only. According to the Prefer A option, the cellular telephone prefers to use an "A" frequency before using a "B" frequency. The Prefer B option is similar in an opposite sense. Under the A Only mode of operation, the cellular telephone uses only "A" frequencies, and conversely uses only "B" frequencies when operating under the B Only mode. Under the Home Only mode, the cellular telephone is prohibited from roaming, and under the SID Only mode, the cellular telephone can be used only when receiving one particular SID entered into memory by the user.

Recently, "A" carriers and "B" carriers have been entering into customized roaming agreements whereby cellular telephones serviced by one of the agreeing carriers are able to operate at reduced rates in areas serviced by the other carrier. Unfortunately, the standard A/B system selection options do not provide customized carrier selection functions for any purpose, including supporting customized roaming agreements between carriers. One attempt at solving this problem is disclosed in U.S. Pat. No. 4,916,728, issued to Blair. That patent discloses a carrier selection method which, when no SID matching the home SID is received, allows normal operation only when a SID that does not exist on an exclusion list (or conversely exists on a "good" list) is received. A 911 override is also provided to allow dialing of certain emergency numbers if the only SID received is on the exclusion list. That method exhibits drawbacks by potentially denying available service when both available SIDs are on the exclusion list or when the only available SID is on the exclusion list due to dead spots in, or gaps between, service areas. It is also unclear how the new mode of carrier selection affects the standard A/B system selection feature.

In addition, one type of cellular telephone, such as that disclosed in U.S. Pat. No. 5,020,091, issued to Krolopp et al., includes multiple NAMs for subscription to multiple carriers. In this way, the cellular telephone owner can take advantage of potentially lower rates in multiple geographically diverse areas by subscribing to carriers within each service area. The telephone disclosed by the '091 patent further discloses means for prompting a user to choose to use a particular NAM when the cellular telephone is moved into an area serviced by a carrier with which the user has been assigned a local number. Consequently, the user is required to respond to such a prompt in order to benefit from the potentially more advantageous rates each time a new carrier is locationally "home" to the cellular telephone.

There is, therefore, a need in the industry for a system which addresses these and other related, and unrelated, problems.

SUMMARY OF THE INVENTION

Briefly described, the present invention includes, in its most preferred embodiment, a method and an apparatus for selecting a cellular carrier frequency for accessing cellular airtime services based upon a list of preferred SIDs. A cellular telephone is programmed to accept into memory a list of preferred, rather than "good", SIDs corresponding to carriers through which service will be preferred. When an installer technician enters a SID into the preferred list, the standard A/B system selection function is, while any S ID remains in the preferred list, replaced by a substitute system selection function which includes only three carrier selection modes including the Home Only mode, the SID Only mode, and a Roam Saver mode. When the Roam Saver carrier selection mode is selected by the user, while the cellular telephone will prefer service through a carrier broadcasting a SID matching a SID on the preferred list, the cellular telephone will never deny service to emergency or non-emergency destinations if any SID, including one not on the preferred list, is received by the cellular telephone.

Status indicators are used to, among other purposes, differentiate between no service being available, service being available through a carrier broadcasting a SID matching a home SID (a home carrier), service being available through a carrier broadcasting a SID matching a SID on the preferred list (a preferred SID), and service being available through a carrier broadcasting a SID not matching a home SID or a SID on the preferred list (a non-preferred available SID). In the preferred embodiment, indicator lights are employed, while alternate embodiments include status indicators taking the form of display icons, other lights or lamps, display messages, audible tones, voice messages, etc. According to the preferred embodiment, carrier status indicators are steady or intermittent depending on whether the detected SID is a preferred SID or a non-preferred SID, thus no indicator distinction is made between detection of primary carriers (carriers of the A/B type of the first home carrier) and secondary carriers (carriers of the A/B type opposite the first home carrier). Also, in addition to multiple NAMs being included to support subscriptions to services from multiple carriers, the user is provided the option of manually selecting which NAM is used or enabling the cellular telephone, through an auto-NAM function, to automatically select and use the NAM of any home carrier detected by the cellular telephone.

It is therefore an object of the present invention to provide a method and an apparatus for selecting a cellular carrier frequency for accessing cellular airtime services based upon a list of preferred SIDs.

Another object of the present invention is to provide a method and an apparatus for providing a Roam Saver carrier selection mode in which service is never denied for either emergency or non-emergency calls when any SID is detected.

Yet another object of the present invention is to provide a method and an apparatus for, through storing at least one SID in a preferred list memory location, enabling a user to select a Roam Saver carrier selection mode in which service is never denied for either emergency or non-emergency calls when any SID is detected, wherein the Roam Saver carrier selection option becomes unavailable when all SIDs are removed from the preferred list memory locations.

Still another object of the present invention is to provide a method and an apparatus for, through storing at least one SID in a preferred list memory location, enabling a user to select among only three carrier selection options including a Roam Saver carrier selection mode for preferably selecting carriers from a preferred list, a Home Only mode for selecting only home carriers, and SID Only mode for selecting only a user-defined carrier.

Still another object of the present invention is to provide a method and an apparatus for providing status indication to distinguish between preferred carrier access and non-preferred carrier access.

Other objects, features and advantages of the present invention will become apparent upon reading and understanding the present specification, when taken in conjunction with the accompanying drawings.

DETAILED DESCRIPTION OF THE PREFERRED EMBODIMENT

Figures 1, 2:
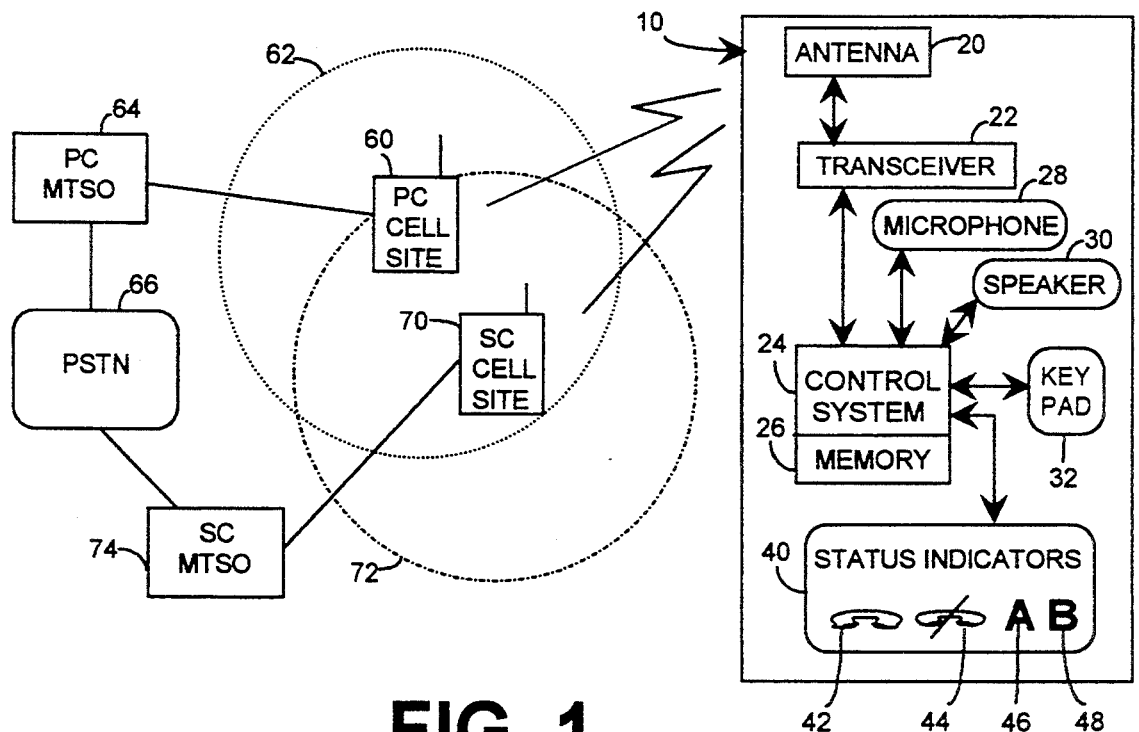
FIG. 1 is a block diagram representation of a cellular telephone capable of communicating with provider networks in accordance with the preferred embodiment of the present invention.
FIG. 2 is a chart of carrier selection priority levels with corresponding status indicator configurations.

Referring now in greater detail to the drawings in which like numerals represent like components throughout the several views, FIG. 1 shows, among other elements, a block diagram representation of a cellular telephone 10. With the exception of unique programming and memory configurations and contents, the cellular telephone 10 of the preferred embodiment of the present invention is very similar to conventional cellular telephones. An antenna 20 is shown connected through a transceiver 22 to a microprocessor-based logic control system 24 having access to memory 26. Memory 26 is configured to contain programming information for directing operation of the cellular telephone, a memory area for receiving a list of preferred system identification codes (SIDs) from an installer technician, and multiple number assignment modules (NAMs) in which an installer technician stores, among other information, SIDs corresponding to each provider of cellular airtime services with which the owner of the cellular telephone has subscribed. A conventional microphone 28, speaker 30, and key pad 32 are also shown connected to the control system 24.

A set of status indicators 40 are also shown connected to the control system 24 and include an in use indicator 42, a no service indicator 44, a roam A carrier indicator 46, and a roam B carrier indicator 48. Either roam A carrier indicator 46 or roam B carrier indicator 48 will be activated to indicate the A/B carrier type of the system being accessed in a roaming condition. As is discussed below, roam indicator 46 or 48 will light continuously when the cellular telephone 10 is roaming on a carrier whose SID is included in the preferred SID list, while roam indicator 46 or 48 will blink when the cellular telephone 10 is roaming on a carrier whose SID is not included on the preferred SID list.

The cellular telephone 10 is shown capable of communicating through radio waves with both a primary carrier cell site 60 and a secondary carrier cell site 70 of conventional cellular provider networks. The primary carrier cell site 60 provides service to a primary carrier cell coverage area 62, and the secondary carrier cell site 70 provides service to a secondary carrier cell coverage area 72. According to this preferred embodiment, the primary carrier cell site 60 is shown connected through landlines to a primary carrier mobile switching office (MTSO) 64 which is, in turn, connected through landline trunks to the public switched telephone network (PSTN) 66. Likewise, the secondary carrier cell site 70 is connected through landlines to a secondary carrier MTSO 74 which is, in turn, connected through landline trunks to the PSTN 66.

The designation "primary" refers to the A/B system type of the carrier whose SID is stored in the first NAM within memory 26, and the designation "secondary"

refers to the other of the two A/B system types. Thus, the primary carrier cell site 60 communicates through frequencies within a frequency set designated for use by one of the A/B system types, while the secondary carrier cell site 70 communicates through frequencies within a frequency set designated for use by the other A/B system type. Thus, the frequency set designated for use by the primary carrier is referred to herein as the primary (or home) frequency set, while the frequency set designated for use by the secondary carrier is referred to herein as the secondary (or non-home) frequency set. The designations "primary" and "secondary" may each, therefore, refer to either "A" or "B" type carriers. According to FIG. 1, to be capable of communicating with both the primary carrier cell site 60 and the secondary carrier cell site 70, the cellular telephone 10 must be located within the overlapping portion between the primary carrier cell coverage area 62 and the secondary carrier cell coverage area 72. Furthermore, within any given service area for a carrier, one or more carrier cell coverage areas 62, 72 are located adjacent to one another in conventional arrangement. However, due to a variety of factors, most service areas have holes caused by deadspots or gaps between cell coverage areas. It is often the case that the other carrier within that service area is able to supply service within those holes.

Referring also to FIG. 2, which shows carrier selection priority levels with configurations of the status indicators 40, the no service indicator 44 is shown to be off for every situation except that of priority level 7 where the cellular telephone 10 is unable to detect any SID from any carrier cell site 60, 70. In such a scenario, the roam indicators 46, 48 are also off. The in use indicator 42 is illuminated whenever a user attempts to access cellular service using the cellular telephone 10. Also, in interpreting the chart of FIG. 2, it should be understood that with each lower priority level, (corresponding to increasing priority numbers) SIDs of preceding higher priority levels are not detectable.

If the cellular telephone 10 is located within a primary carrier cell coverage area 62 and is able to receive signals from a primary carrier cell site 60 broadcasting a SID corresponding to a SID stored as a home SID in a NAM within the telephone 10, the carrier selection priority level is priority level 1, the highest priority level. In such a scenario, the no service indicator 44 and both of the roam indicators 46, 48 are off. Likewise, the status indicators 44, 46, 48 are also off during a priority level 2 situation where the cellular telephone 10 is located within a secondary carrier coverage area 72 and is able to receive signals from a secondary carrier cell site 70 broadcasting a SID corresponding to a SID stored as a home SID in a NAM within the telephone 10. Priority levels 3 or 4 occur when the cellular telephone 10 is located to be able to detect a SID matching a SID on the preferred SID list within the memory 26 having been broadcast from a primary or secondary carrier cell site 60 or 70, respectfully. Depending on whether the carrier is an "A" type or "B" type, and regardless of whether the carrier is a primary or secondary carrier, either the roam A carrier indicator 46 or the roam B carrier indicator 48 will be continuously illuminated. During priority level 5 and 6 situations, the no service indicator 44 is also off, but the appropriate roam indicator 46 or 48 is intermittently illuminated. Priority levels 5 and 6 are reached when the only SIDs detectable are not home SIDS or preferred SIDs. Thus, the solid versus blinking distinction in the roam indicators 46 and 48 designate the detection of preferred versus non-preferred available SIDs.

It should be understood that in alternate embodiments of the present invention, the status indicators 40 include alternately constructed and operated indicators 44, 46, 48. In one such alternate embodiment, the roam A and B carrier indicators 46, 48 are combined into one indicator, and in another alternate embodiment, a separate indicator is utilized to indicate whether or not an available SID is on the preferred list. Furthermore, it should be understood that the scanning and selecting steps of the below preferred method are merely exemplary since many possible equivalent sequences of search and selection operations may be utilized to determine carrier availability and select a carrier in any given area. Thus, the scope of the present invention is understood to include other methods for achieving the selection results and status indicator configurations represented by the priority levels of FIG. 2.

Figure 3:
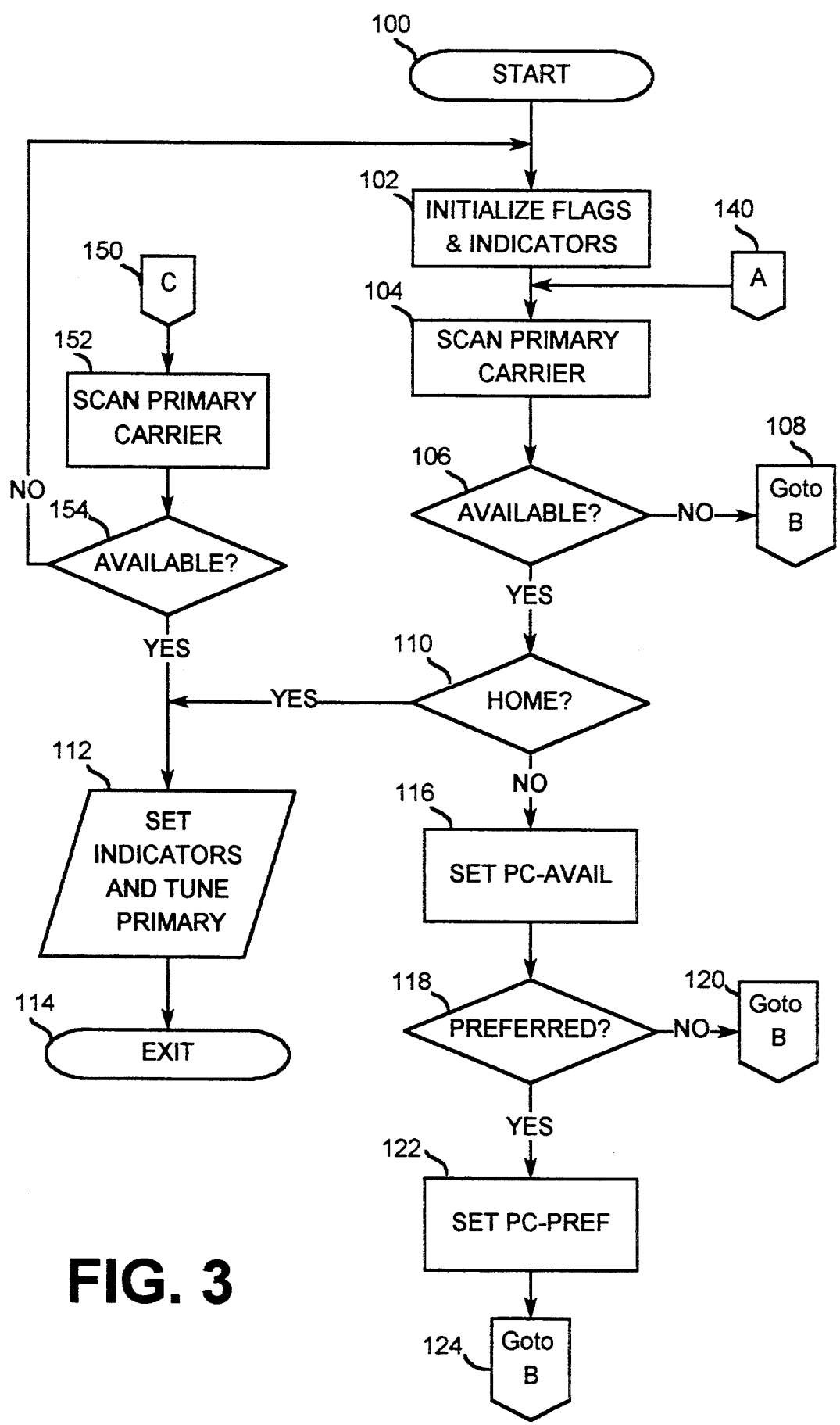
FIGS. 3–5 are flow chart representations of the steps of one method of the preferred embodiment of the present invention.
Figure 4:
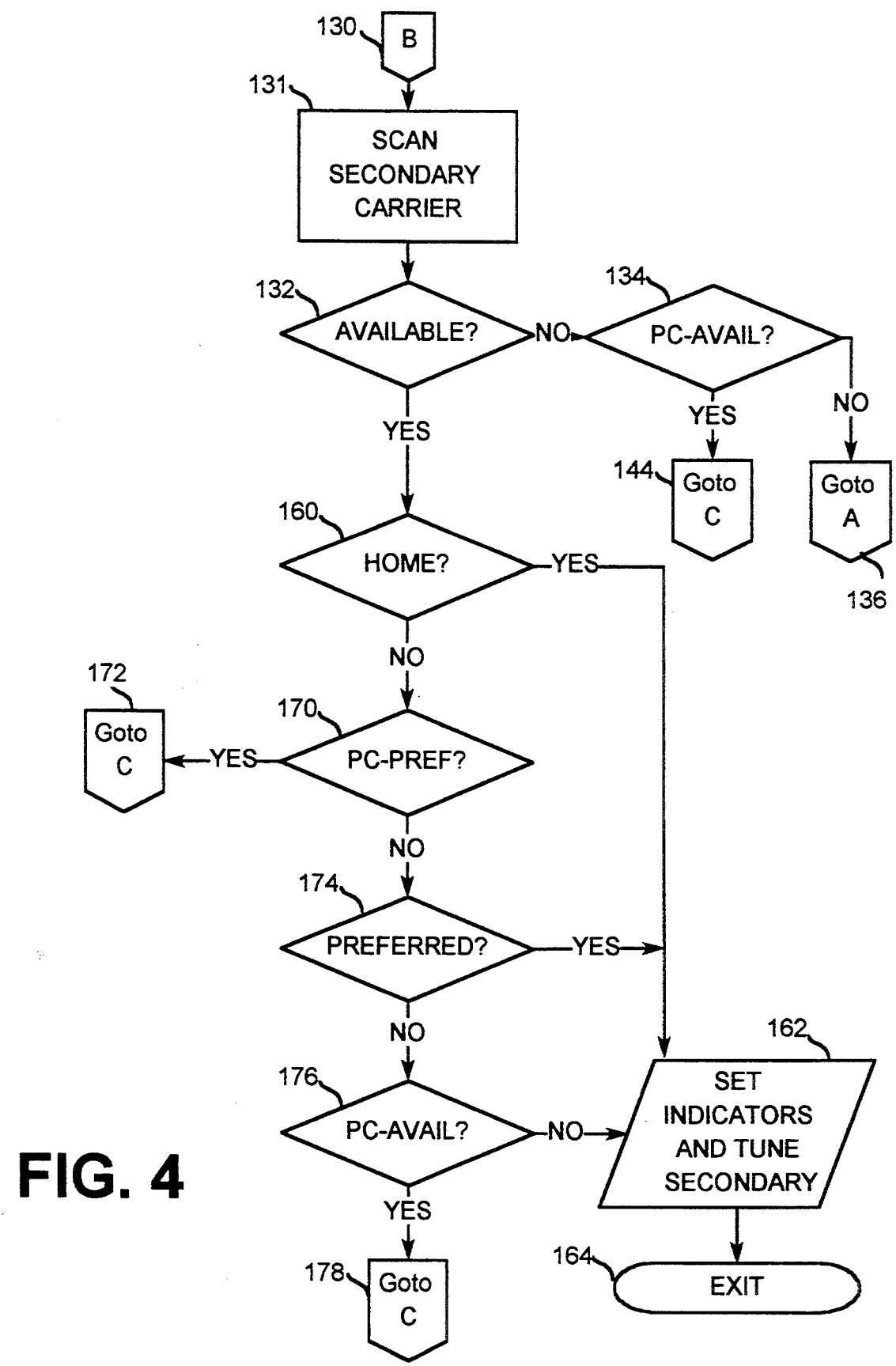
Figure 5:
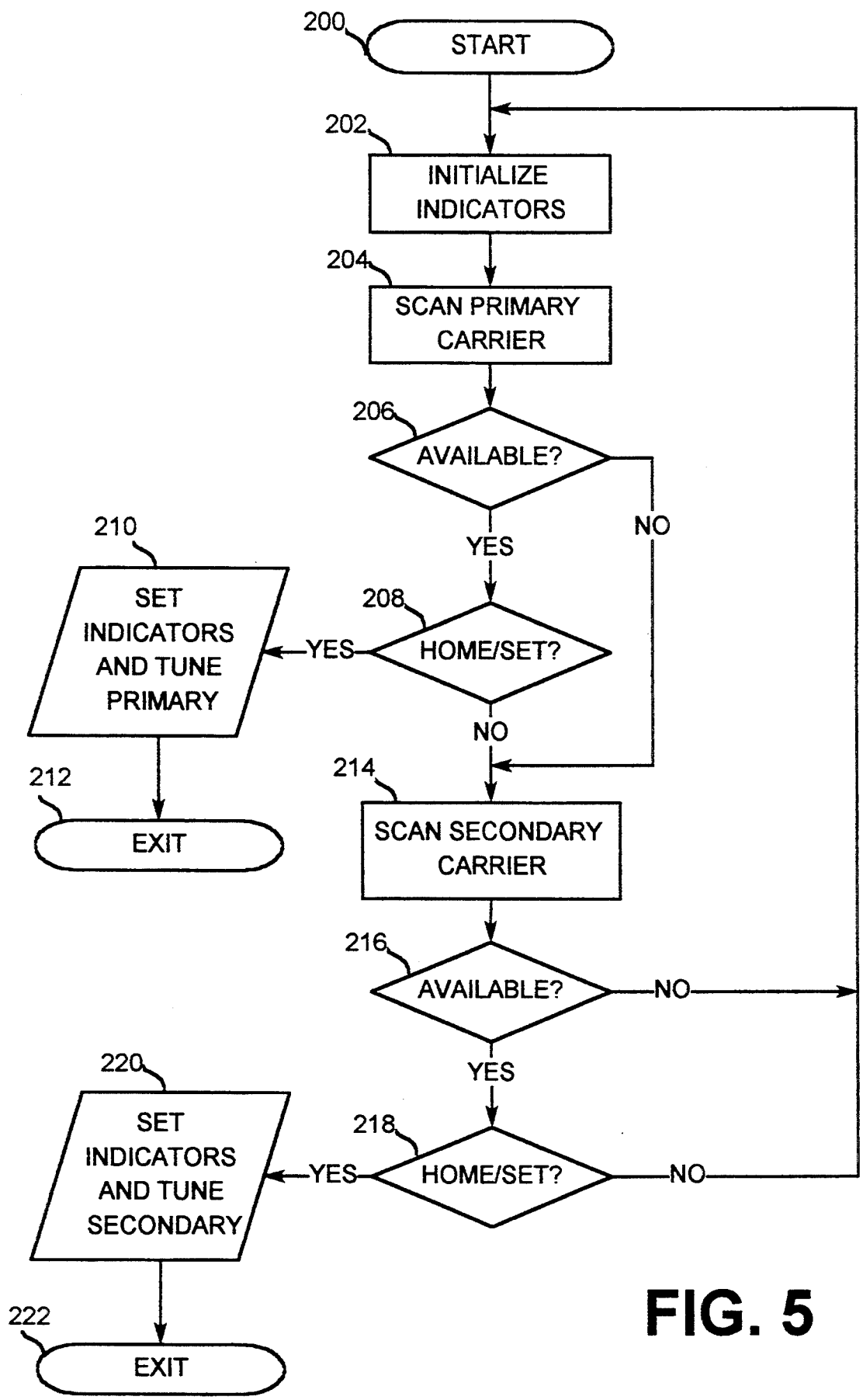

Referring now also to FIGS. 3–5, flow chart representations show the steps of the carrier selection method according to the preferred embodiment of the present invention. Before beginning the carrier selection process at step 100 in FIG. 3 or step 200 in FIG. 5, an installer enters at least one SID into an area in memory 26 (FIG. 1) to begin a preferred list, thereby replacing the standard A/B system selection function with a substitute system selection function which allows a user to select from among only three carrier selection modes including the Home Only mode, the SID Only mode, and a Roam Saver mode. The standard A/B system selection function is enabled once more if all SIDs are removed from the preferred list. FIGS. 3 and 4 represent the Roam Saver mode, and FIG. 5 represents the Home Only and SID Only modes. When the Roam Saver carrier selection mode is selected by the user, while the cellular telephone 10 will prefer service through a carrier broadcasting a SID matching a SID on the preferred list, the cellular telephone 10 will never deny service to emergency or non-emergency destinations if any SID, including one not on the preferred list, is detected by the cellular telephone 10.

After the Roam Saver carrier selection process begins at step 100, internal flags and the status indicators 44, 46, 48 are initialized. The internal flags include PC-AVAIL and PC-PREF which are both set to NO; the no service indicator 44 is set to ON, and the roam carrier indicators 46, 48 are set to OFF. The PC-AVAIL (primary carrier available) flag is used to indicate whether any SID has been detected during a scan of the primary carrier frequencies, and the PC-PREF flag (primary carrier preferred) is used to indicate whether a SID matching one on the preferred list has been detected during a scan of the primary carrier frequencies. At step 104, the primary carrier frequencies are scanned to detect any SIDs being broadcast by primary carrier cell sites 60. According to the preferred embodiment of the present invention, if more than one SID is detected during this monitoring of the primary carrier frequencies, the SID received on the strongest signal is used. At decision 106, a decision is made as to whether a SID was detected during the scan of primary carrier frequencies. If a SID was not detected, the process continues at connector 108 which transfers control to the B connector 130 in FIG. 4, as is discussed below. On the other hand, if a SID was detected, the process continues at decision 110 where a determination is made as to whether the detected SID is a home SID. As discussed above, such determination includes comparing the detected SID to the home SIDs in all NAMs if the auto-NAM feature is enabled, and otherwise comparing the SID to the active NAM if the auto-NAM feature is disabled.

If the detected SID matches a home SID, the process continues at step 112 where the status indicators 44, 46, 48 are set and the cellular telephone 10 is tuned to the frequency of the detected primary home SID. The process of tuning a cellular telephone 10 would be understood by one reasonably skilled in the industry. Setting of the indicators 44, 46, 48 would follow that of priority level 1 shown in FIG. 2 wherein all of the indicators 44, 46, 48 are turned off. Finally, the process is terminated at step 114. Periodically, and when a user actually attempts to place a call, the process is repeated to compensate for movement of the cellular telephone 10. If the detected SID is not a home SID, the PC-AVAIL flag is set to YES at step 116. The detected SID is then compared to the SIDs in the preferred list at decision 118 to determined if the detected SID is a preferred SID. If the detected SID is not a preferred SID, the process continues at connector 120 which transfers control to the B connector in FIG. 4, as is discussed below. Alternately, if the detected SID is a preferred SID, the PC-PREF flag is set to YES at step 122, and the process continues at connector 124 which also transfers control to the B connector 130 in FIG. 4.

Referring to FIG. 4, after the B connector 130, the flow chart representation shows that the frequencies of the secondary carrier are scanned for SIDs. If no SIDs are detected, the NO branch of the decision 132 is taken to decision 134 which checks the PC-AVAIL flag. If the PC-AVAIL flag was not set earlier at step 116 in FIG. 3, the process continues at connector 136 which transfers control to the A connector 140 in FIG. 3 where the process essentially begins again. On the other hand, if the PC-AVAIL flag was set to YES, the process continues at connector 144 which transfer control to the C connector 150 in FIG. 3. Referring back to FIG. 3, after the C connector 150, the primary carrier frequencies are scanned again at step 152 to ensure that the carrier which supplied the SID previously detected on the primary carrier is still available. If the SID is not detected at step 154, the NO branch is taken to restart the process, but if the SID was again detected on the primary carrier, the YES branch is taken such that step 112 sets the indicators 44, 46, 48 and tunes the cellular telephone 10 to the primary carrier detected. In this case, the indicators 44, 46, 48 are set according to priority level 3 or 5 of FIG. 2, depending on whether the process flowed through connector 124 or connector 120, respectively. For example, if the SID detected during the scan of the primary carrier frequency set was on the preferred list, the process flowed through the connector 124, and the indicators 44, 46, 48 are set according to the priority level 3 of FIG. 2.

Referring back to FIG. 4, if SIDs are detected during the scan of the secondary carrier frequency set, the YES branch of decision 132 is taken. At decision 160, like decision 110 of FIG. 3, it is determined whether the SID detected in step 13 1 is a home SID. If So, the YES branch is taken to step 162 which sets the indicators 44, 46, 48 according to priority level 2 of FIG. 2, and tunes the cellular telephone 10 to the secondary carrier, after which the process is terminated at step 164. On the other hand, if the SID detected in step 131 is not a home SID, the PC-PREF flag is checked at step 170 to determine if a preferred SID was previously detected during the scan of the primary carrier frequency set. If so, the process continues at connector 172 which also transfers control to the C connector 150 in FIG. 3. Once again if the primary carrier is still available (step 154 in FIG. 3), the cellular telephone 10 is tuned to the primary carrier, and the indicators 44, 46, 48 set according to priority level 3 of FIG. 2. If the PC-PREF flag was not set, the NO branch of decision 170 is taken to decision 174 which determines if the SID detected during the scan of the secondary carrier frequency set is a preferred SID. If so, the YES branch is taken to step 162 which indicates that the cellular telephone 10 is tuned to the secondary carrier and sets the indicators according to priority level 4 of FIG. 2. On the other hand, if the secondary carrier SID is not a preferred SID, the PC-AVAIL flag is checked at decision 176. If the PC-AVAIL flag is NO, the cellular telephone is set to the secondary carrier, and the status indicators 44, 46, 48 are set according to priority level 6 of FIG. 2. Alternatively, the process continues at connector 178 which also transfers control to the C connector 150 of FIG. 3 after which the cellular telephone 10 is tuned to the primary carrier, if available, and the indicators 44, 46, 48 are set according to priority level 5 of FIG. 2.

If the user selects the Home Only or SID Only modes of operation, the carrier selection process proceeds according to the flow chart shown in FIG. 5 rather than those shown in FIGS. 3 and 4. The steps shown in FIG. 5 are similar to the conventional Home Only and SID only carrier selection modes of the standard A/B system selection function. If the user selects the SID Only mode of operation, the user is prompted to input the desired SID into memory 26. If the user selects the Home Only mode, the process will compare detected SIDs to all or individual NAMs depending whether the auto-NAM feature is enabled by the user. After the process starts at step 200, the no service indicator 44 is turned on, and the roam carrier indicators 46, 48 are turned off. The primary carrier frequency set is then scanned at step 204, and if any SIDs are detected, the YES branch of decision 206 is taken to decision 208. At decision 208, depending on whether a Home Only or a SID Only mode is selected by the user, the detected SID is compared to a home SID or a preset user-defined SID, respectively. If the detected SID matches such a home or set SID, the cellular telephone 10 is tuned to the primary carrier, and the no service indicator 44 is turned off. Also, if the SID Only mode has been selected by the user, the appropriate roam indicator 46, 48 is illuminated continuously, thus a SID entered by a user in the SID Only mode is treated as a preferred SID for illumination purposes according to the chart of FIG. 2. Subsequently, the process is terminated at step 212, and, like the process of FIGS. 3 and 4, the process of FIG. 5 is periodically, and when a user actually attempts to place a call, repeated to compensate for movement of the cellular telephone 10. If no SID is detected such that the NO branch of decision 206 is taken, or if a detected SID causes the NO branch of decision 208 to be taken, the process flows to step 214 which indicates that the secondary carrier frequency set is scanned. If no SID is detected or if a detected SID does not match a home or set SID, the process loops back to step 202. Otherwise, the cellular telephone 10 is tuned to the secondary carrier, and the status indicators 44, 46, 48 set in a manner similar to step 210. Subsequently, the process is terminated at step 222.

According to the preferred embodiment of the present invention, the preferred SID list identifies providers associated with the provider identified in the first NAM of memory 26. In other embodiments of the present invention, multiple preferred SID lists are included for association with each of the NAM's, and in still other embodiments, one large SID list with associations to different NAM's is utilized.

While the embodiments of the present invention which have been disclosed herein are the preferred forms, other embodiments of the present invention will suggest themselves to persons skilled in the art in view of this disclosure. Therefore, it will be understood that variations and modifications can be effected within the spirit and scope of the invention and that the scope of the present invention should only be limited by the claims below.

We claim:

1. A method for selecting a cellular carrier frequency for accessing cellular airtime services, said method comprising the steps of:

defining at least one predefined home system identification code (SID) and at least one predefined preferred SID;

monitoring a plurality of frequencies to detect any SID corresponding to any frequency of the plurality of frequencies, including steps of monitoring a plurality of primary carrier frequencies to detect any SID corresponding to any frequency of the plurality of primary carrier frequencies, and monitoring a plurality of secondary carrier frequencies to detect any SID corresponding to any frequency of the plurality of secondary carrier frequencies;

selecting a frequency, for calls to ordinary telephone numbers, corresponding to a SID matching said predefined home SID if the SID matching said predefined home SID is detected, including steps of selecting a primary carrier frequency corresponding to the SID matching said predefined home SID if the SID matching said predefined home SID is detected upon the primary carrier frequency, and selecting a secondary carrier frequency corresponding to the SID matching said predefined home SID if the SID matching said predefined home SID is detected upon the secondary carrier frequency and the SID matching said predefined home SID is not detected upon any primary carrier frequency;

selecting a frequency, for-calls to ordinary telephone numbers, corresponding to a SID matching said predefined preferred SID if the SID matching said predefined preferred SID is detected and no SID matching said predefined home SID is detected; and selecting a frequency, for calls to ordinary telephone numbers, corresponding to a SID not matching either said predefined home SID or said predefined preferred SID if the SID not matching either said predefined home SID or said predefined preferred SID is detected and no SID matching either said predefined home SID or said predefined preferred SID is detected.

2. The method of claim 1, wherein the step of monitoring the plurality of frequencies includes, at least, the steps of designating a plurality of carrier frequencies as primary carrier frequencies by determining a carrier type of a SID stored in an initial number assignment module, and designating a remaining plurality of carrier frequencies as secondary carrier frequencies in response to the step of designating the plurality of carrier frequencies as primary carrier frequencies.

3. The method of claim 1, wherein the step of selecting the frequency corresponding to a SID matching said predefined preferred SID includes, at least, the steps of selecting a primary carrier frequency corresponding to the SID matching said predefined preferred SID if the SID matching said predefined preferred SID is detected upon the primary carrier frequency, and no SID matching said predefined home SID is detected on any frequency, and selecting a secondary carrier frequency corresponding to the SID matching the predefined preferred SID if the SID matching said predefined preferred SID is detected upon the secondary carrier frequency, no SID matching said predefined home SID is detected on any frequency, and no SID matching said predefined preferred SID is detected upon any primary carrier frequency.

4. The method of claim 3, wherein the step of selecting the frequency corresponding to a SID not matching either said predefined home SID or said predefined preferred SID includes, at least, the steps of selecting a primary carrier frequency corresponding to a SID not matching either said predefined home SID or said predefined preferred SID if the SID not matching either said predefined home SID or said predefined preferred SID is detected upon a primary carrier frequency, and no SID matching either said predefined home SID or said predefined preferred SID is detected on any frequency, and selecting a secondary carrier frequency corresponding to a SID not matching either said predefined home SID or said predefined preferred SID if the SID not matching either said predefined home SID or said predefined preferred SID is detected upon the secondary carrier frequency, no SID matching either said predefined home SID or said predefined preferred SID is detected on any frequency, and no SID is detected upon any primary carrier frequency.

5. The method of claim 1, wherein the step of selecting the frequency corresponding to a SID matching said predefined home SID includes, at least, the step of comparing any detected SID to a plurality of predefined home SIDs.

6. The method of claim 5, wherein the step of selecting the frequency corresponding to a SID matching said predefined home SID further includes, at least, the step of automatically selecting a frequency corresponding to a first SID matching the predefined home SID from the plurality of predefined home SIDs.

7. The method of claim 5, wherein the step of comparing any detected SID to the plurality of predefined home SIDs is responsive to selective user enablement.

8. The method of claim 1, wherein the step of selecting the frequency corresponding to a SID matching said predefined preferred SID is responsive to selective enablement.

9. The method of claim 8, wherein the selective enablement includes entering at least one predefined preferred SID into a memory device.

10. The method of claim 9, wherein the selective enablement further includes selective user enablement.

11. The method of claim 1, further comprising the steps of defining at least one user-defined SID, and selecting the frequency corresponding to a SID matching said user-defined SID if the SID matching said user-defined SID is detected, wherein all of the selecting steps are responsive to being selectively user enabled, and wherein the method further comprises the step of providing a user with an opportunity of choosing between only three carrier selection modes consisting of a roam saver mode wherein all the selecting steps are enabled, a home only mode wherein only the step of selecting a frequency corresponding to a SID matching said predefined home SID is enabled, and a SID only mode wherein only the step of selecting a frequency corresponding to a SID matching said user-defined SID is enabled.

12. The method of claim 1, further comprising the step of activating a no service indicator only if no SID is detected.

13. The method of claim 1, further comprising the steps of activating neither a roam status indicator nor a no service indicator if a frequency corresponding to a SID matching said predefined home SID is selected;

continuously activating a roam status indicator if a frequency corresponding to a SID matching said predefined preferred SID and not matching said predefined home SID is selected;

intermittently activating a roam status indicator if a frequency corresponding to a SID not matching either said predefined home SID or said predefined preferred SID is selected; and activating a no service indicator only if no SID is detected.

14. A cellular carrier frequency selection apparatus comprising:

detecting means for monitoring a plurality of frequencies to detect any system identification code (SID) corresponding to any frequency of said plurality of frequencies, wherein said detecting means includes, at least, primary means for monitoring a plurality of primary carrier frequencies to detect any SID corresponding to any frequency of said plurality of primary carrier frequencies, and secondary means for monitoring a plurality of secondary carrier frequencies to detect any SID corresponding to any frequency of said plurality of secondary carrier frequencies; and analyzing means associated with said detecting means for analyzing any SID detected by said detecting means and for selecting a frequency for use with calls, said analyzing means including, at least, memory means for defining at least one predefined home SID and at least one predefined preferred SID, home selecting means for selecting a frequency, for calls to ordinary telephone numbers, corresponding to a SID matching said predefined home SID if the SID matching said predefined home SID is detected, wherein said home selecting means includes, at least, primary home selecting means for selecting a primary carrier frequency corresponding to the SID matching said predefined home SID if the SID matching said predefined home SID is detected upon the primary carrier frequency, and secondary home selecting means for selecting a secondary carrier frequency corresponding to the SID matching said predefined home SID if the SID matching said predefined home SID is detected upon the secondary carrier frequency and the SID matching a predefined home SID is not detected upon any primary carrier frequency, preferred selecting means for selecting a frequency, for calls to ordinary telephone numbers, corresponding to a SID matching said predefined preferred SID if the SID matching said predefined preferred SID is detected and no SID matching said predefined home SID is detected, and remainder selecting means for selecting a frequency, for calls to ordinary telephone numbers, corresponding to a SID not matching either said predefined home SID or said predefined preferred SID if the SID not matching either said predefined home SID or said predefined preferred SID is detected and no SID matching either said predefined home SID or said predefined preferred SID is detected.

15. The apparatus of claim 14, wherein said preferred selecting means includes, at least, primary preferred selecting means for selecting a primary carrier frequency corresponding to the SID matching said predefined preferred SID if the SID matching said predefined preferred SID is detected upon the primary carrier frequency, and no SID matching said predefined home SID is detected, and secondary preferred selecting means for selecting a secondary carrier frequency corresponding to the SID matching said predefined preferred SID if the SID matching said predefined preferred SID is detected upon said secondary carrier frequency, no SID matching said predefined home SID is detected, and no SID matching said predefined preferred SID is detected upon any primary carrier frequency.

16. The apparatus of claim 15, wherein said remainder selecting means includes, at least, primary remainder selecting means for selecting a primary carrier frequency corresponding to the SID not matching either said predefined home SID or said predefined preferred SID if the SID not matching either said predefined home SID or said predefined preferred SID is detected upon the primary carrier frequency, and no SID matching either said predefined home SID or said predefined preferred SID is detected, and secondary remainder selecting means for selecting a secondary carrier frequency corresponding to the SID not matching either said predefined home SID or said predefined preferred SID if the SID not matching either said predefined home SID or said predefined preferred SID is detected upon the secondary carrier frequency, no SID matching either said predefined home SID or said predefined preferred SID is detected, and no SID not matching either said predefined home SID or said predefined preferred SID is detected upon any primary carrier frequency.

17. The apparatus of claim 14, wherein said home selecting means includes, at least, a multiple analysis means for comparing any detected SID to a plurality of predefined home SIDs.

18. The apparatus of claim 17, wherein said multiple analysis means includes, at least, an automatic means for automatically selecting a frequency corresponding to a first SID matching the predefined home SID from said plurality of predefined home SIDs.

19. The apparatus of claim 17, wherein said multiple analysis means includes, at least, a selective means for selectively activating said multiple analysis means.

20. The apparatus of claim 14, wherein said preferred selecting means includes, at least, a responsive means for enabling said preferred selecting means.

21. The apparatus of claim 20, wherein said responsive means includes, at least, means for enabling said preferred selecting means upon entering at least one predefined preferred SID into a memory device.

22. The apparatus of claim 21, wherein said preferred selecting means further includes, at least, a user disabling means for selectively disabling said preferred selecting means without deleting all SIDs from said memory device.

23. The apparatus of claim 14, further comprising a mode means for providing a user with an option of choosing between only three carrier selection modes for enabling said selecting means, said mode means including, at least, a roam saver mode means for enabling all selecting means of said analyzing means, a home only mode means for enabling said home selecting means and disabling said preferred selecting means and said remainder selecting means, wherein only SIDs matching said predefined home SID are selected, and a SID only mode means for disabling said home selecting means, said preferred selecting means, and said remainder selecting means and for providing said analyzing means with a SID only selecting means for selecting a frequency corresponding to a SID matching a predefined SID if a SID matching said predefined SID is detected.

24. The apparatus of claim 14, further comprising means for activating a no service indicator only if no SID is detected.

25. The apparatus of claim 14, further comprising display means for displaying carrier selection including, at least, home display means for activating neither a roam status indicator nor a no service indicator if a frequency corresponding to a SID matching said predefined home SID is selected;

preferred display means for continuously activating a roam status indicator if a frequency corresponding to a SID matching said predefined preferred SID and not matching said predefined home SID is selected;

remainder display means for intermittently activating a roam status indicator if a frequency corresponding to a SID not matching either said predefined home SID or said predefined preferred SID is selected; and no service means for activating a no service indicator only if no SID is detected.

26. A method for selecting a cellular carrier frequency for accessing cellular airtime services, said method comprising the steps of:

defining at least one predefined home system identification code (SID) and at least one predefined preferred SID;

monitoring a plurality of frequencies to detect any SID corresponding to any frequency of the plurality of frequencies, including steps of designating a plurality of carrier frequencies as primary carrier frequencies by determining a carrier type of a SID stored in an initial number assignment module, designating a remaining plurality of carrier frequencies as secondary carrier frequencies in response to the step of designating the plurality of carrier frequencies as primary carrier frequencies, monitoring the plurality of primary carrier-frequencies to detect any SID corresponding to any frequency of the plurality of primary carrier frequencies, and monitoring the plurality of secondary carrier frequencies to detect any SID corresponding to any frequency of the plurality of secondary carrier frequencies;

selecting a frequency, for calls to ordinary telephone numbers, corresponding to a SID matching said predefined home SID if the SID matching said predefined home SID is detected;

selecting a frequency, for calls to ordinary telephone numbers, corresponding to a SID matching said predefined preferred SID if the SID matching said predefined preferred SID is detected and no SID matching said predefined home SID is detected; and selecting a frequency, for calls to ordinary telephone numbers, corresponding to a SID not matching either said predefined home SID or said predefined preferred SID if the SID not matching either said predefined home SID or said predefined preferred SID is detected and no SID matching either said predefined home SID or said predefined preferred SID is detected.

27. The method of claim 26, wherein the step of selecting the frequency corresponding to a SID matching a predefined home SID includes, at least, the steps of selecting a primary carrier frequency corresponding to the SID matching said predefined home SID if the SID matching said predefined home SID is detected upon the primary carrier frequency, and selecting a secondary carrier frequency corresponding to the SID matching said predefined home SID if the SID matching said predefined home SID is detected upon the secondary carrier frequency and the SID matching said predefined home SID is not detected upon any primary carrier frequency.

28. The method of claim 27, wherein the step of selecting the frequency corresponding to a SID matching said predefined preferred SID includes, at least, the steps of selecting a primary carrier frequency corresponding to the SID matching said predefined preferred SID if
the SID matching said predefined preferred SID is detected upon the primary carrier frequency, and
no SID matching said predefined home SID is detected on any frequency, and
selecting a secondary carrier frequency corresponding to the SID matching the predefined preferred SID if
the SID matching said predefined preferred SID is detected upon the secondary carrier frequency,
no SID matching said predefined home SID is detected on any frequency, and
no SID matching said predefined preferred SID is detected upon any primary carrier frequency.

29. The method of claim 28, wherein the step of selecting the frequency corresponding to a SID not matching either said predefined home SID or said predefined preferred SID includes, at least, the steps of selecting a primary carrier frequency corresponding to a SID not matching either said predefined home SID or said predefined preferred SID if
the SID not matching either said predefined home SID or said predefined preferred SID is detected upon a primary carrier frequency, and
no SID matching either said predefined home SID or said predefined preferred SID is detected on any frequency, and
selecting a secondary carrier frequency corresponding to a SID not matching either said predefined home SID or said predefined preferred SID if
the SID not matching either said predefined home SID or said predefined preferred SID is detected upon the secondary carrier frequency,
no SID matching either said predefined home SID or said predefined preferred SID is detected on any frequency, and
no SID is detected upon any primary carrier frequency.

30. The method of claim 26, wherein the step of selecting the frequency corresponding to a SID matching said predefined home SID includes, at least, the step of comparing any detected SID to a plurality of predefined home SIDs.

31. The method of claim 30, wherein the step of selecting the frequency corresponding to a SID matching said predefined home SID further includes, at least, the step of automatically selecting a frequency corresponding to a first SID matching the predefined home SID from the plurality of predefined home SIDs.

32. The method of claim 30, wherein the step of comparing any detected SID to the plurality of predefined home SIDs is responsive to selective user enablement.

33. The method of claim 26, wherein the step of selecting the frequency corresponding to a SID matching said predefined preferred SID is responsive to selective enablement.

34. The method of claim 33, wherein the selective enablement includes entering at least one predefined preferred SID into a memory device.

35. The method of claim 34, wherein the selective enablement further includes selective user enablement.

36. The method of claim 26, further comprising the steps of defining at least one user-defined SID, and selecting the frequency corresponding to a SID matching said user-defined SID if the SID matching said user-defined SID is detected, wherein all of the selecting steps are responsive to being selectively user enabled, and wherein the method further comprises the step of providing a user with an opportunity of choosing between only three carrier selection modes consisting of a roam saver mode wherein all the selecting steps are enabled,
a home only mode wherein only the step of selecting a frequency corresponding to a SID matching said predefined home SID is enabled, and
a SID only mode wherein only the step of selecting a frequency corresponding to a SID matching said user-defined SID is enabled.

37. The method of claim 26, further comprising the step of activating a no service indicator only if no SID is detected.

38. The method of claim 26, further comprising the steps of activating neither a roam status indicator nor a no service indicator if a frequency corresponding to a SID matching said predefined home SID is selected;
continuously activating a roam status indicator if a frequency corresponding to a SID matching said predefined preferred SID and not matching said predefined home SID is selected;
intermittently activating a roam status indicator if a frequency corresponding to a SID not matching either said predefined home SID or said predefined preferred SID is selected; and
activating a no service indicator only if no SID is detected.

* * * * *